T. J. GLENN.
NUT LOCK.
APPLICATION FILED AUG. 19, 1908.

914,654.

Patented Mar. 9, 1909.

Witnesses
M. C. Lyddane
J. A. L. Mulhall

Inventor
Thomas J. Glenn

By Joshua R. H. Potts
Attorney

UNITED STATES PATENT OFFICE.

THOMAS J. GLENN, OF PHILADELPHIA, PENNSYLVANIA.

NUT-LOCK.

No. 914,654.  Specification of Letters Patent.  Patented March 9, 1909.

Application filed August 19, 1908. Serial No. 449,214.

*To all whom it may concern:*

Be it known that I, THOMAS J. GLENN, a citizen of the United States, residing at Philadelphia, in the county of Philadelphia and State of Pennsylvania, have invented certain new and useful Improvements in Nut-Locks, of which the following is a specification.

My invention relates to nut-locks, and particularly to that class of nut-lock wherein the nut is held against turning by a pin driven through the nut and impinging upon the bolt threads, the object of my invention being to provide an exceedingly simple lock which will positively prevent the return of the nut, and to provide means whereby the pin cannot be accidentally forced out of its engagement with the bolt.

The invention consists in the arrangement of parts and details of construction set forth in the specification and particularly stated in the claim.

Figure 1:
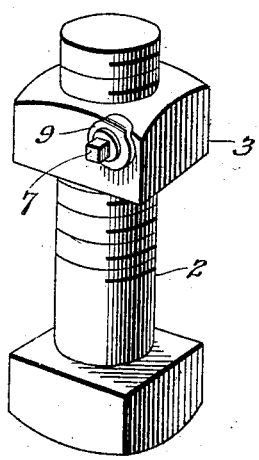
Figure 2:
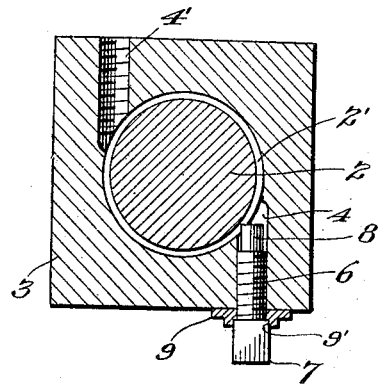
Figure 3:
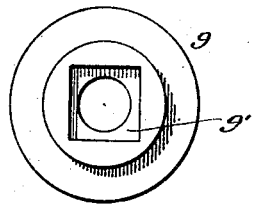
Figure 4:

In the drawings, Figure 1, is a perspective view of a bolt and nut with my nut-lock. Fig. 2, is a section of the bolt and nut. Fig. 3, is a face view of the socketed clench washer. Fig. 4, is a transverse section thereof, and Fig. 5, is a perspective view of the pin.

The bolt 2 is of the usual form as is the nut 3, save for a passage 4 which is drilled into the side of the nut approximately in line with the circumference of the bolt-opening through the nut, and hence at a tangent to the bolt. As shown in Fig. 2 the passage 4 is drilled and tapped. The passage 4 is placed sufficiently near to the upper or lower face of the bolt to permit the washer to be clenched over the same as will be hereafter described. While I may use one passage, I prefer to use two passages 4—4' opposed to each other and located diagonally from each other. Only one locking pin is needed, but the two passages are advisable to prevent the chance of one passage being blocked where a nut is being turned up beneath a flange.

Figure 5:
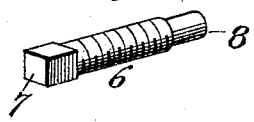

The locking pin 6 shown in Fig. 5 consists of a screw threaded shank of steel having at one end a square head 7. At its other end the shank is plain for about one eighth of an inch as at 8, the end being cut off and at right angles with the axis of the pin so as to form a cutting edge at the corner.

In order to hold the pin fast when inserted, I provide a socketed countersunk washer or plate 9 of relatively malleable material. This is preferably circular in plan, flat on the bottom, and thickened in the center. In this thickened portion is formed a square socket 9' which fits the head 7 as shown in Fig. 2. The locking pin 6 passes through the opening in the washer and its square head fits within the socket 9'. As will be seen from Fig. 4 this construction provides a washer, which until the locking pin is inserted to nearly its full length, is loose upon the locking pin, and that the washer is provided with an exterior flange of relatively thin material adapted to be easily turned down upon the nut.

The operation of the device is as follows: After the nut has been screwed home the pin 6 is passed through the washer and inserted into one of the passages 4. The pin is screwed up until its corner bites into the threads 2' on the bolt, the locking pin acting as its own cutter and cutting a notch or nick in the bolt threads, the pin fitting in the notch and having a solid engagement with the bolt. When the pin is screwed home the side of the clench washer, which because of the location of the passage 4 projects above the upper face of the nut, is bent down or over upon the face of the nut as shown in Fig. 1.

It is obvious that when the washer has been clenched it will be impossible to turn the pin in either direction, and that the washer cannot become accidentally flattened or turned up from its clenched position.

The advantages of my invention particularly lie in the fact that the washer being circular may be turned down and clenched with the locking pin at any position required, and hence there is no slacking back of the pin or nut in order to effect the locking of the nut. It will also be seen that neither the nut nor the bolt are damaged by this form of lock, and that when the locking pin is removed the bolt threads are practically as good as ever, the small nick made by the corner of the locking pin not affecting the later use of the bolt in any manner. This is because the locking pin cuts a nick out of the bolt threads and does not crush the threads. It will also be seen that the nut is very slightly weakened, an important point in practical nut-locks, and that the nut and bolt are of the ordinary commercial form.

Having thus described my invention what I claim as new and desire to secure by Letters Patent is:

In a nut lock, the combination with a bolt, of a nut screwed on to the bolt and having a threaded opening parallel with one edge of the nut and terminating at the bolt opening, a threaded plug in said threaded opening having its inner end disposed at a right angle to its periphery, and its circumference at its inner end made smooth, forming a sharp cutting edge to bite into a thread on the bolt, and a locking washer on said plug constructed and adapted to lock the same against turning.

In testimony whereof I have signed my name to this specification in the presence of two subscribing witnesses.

THOMAS J. GLENN.

Witnesses:
 FREDERIC B. WRIGHT,
 J. A. L. MULHALL.